United States Patent [19]
Cole

[11] Patent Number: 4,553,722
[45] Date of Patent: Nov. 19, 1985

[54] VARIABLE-CAMBER AIRFOIL

[75] Inventor: James B. Cole, Mercer Island, Wash.

[73] Assignee: The Boeing Company, Seattle, Wash.

[21] Appl. No.: 491,951

[22] PCT Filed: Dec. 30, 1982

[86] PCT No.: PCT/US82/01822
§ 371 Date: Dec. 30, 1982
§ 102(e) Date: Dec. 30, 1982

[87] PCT Pub. No.: WO84/02691
PCT Pub. Date: Jul. 19, 1984

[51] Int. Cl.[4] ............................................. B64C 3/50
[52] U.S. Cl. ..................................... 244/219; 244/214
[58] Field of Search ............................... 244/213–215, 244/218, 219

[56] References Cited

U.S. PATENT DOCUMENTS

| | | |
|---|---|---|
| 1,567,531 | 12/1925 | Magni . |
| 1,745,677 | 2/1930 | Hopper . |
| 1,747,637 | 2/1930 | Larsen . |
| 1,803,915 | 5/1931 | Parmele . |
| 2,010,549 | 8/1935 | Maring . |
| 3,836,099 | 9/1974 | O'Neill et al. ............... 244/214 |
| 3,994,451 | 11/1976 | Cole . |
| 3,994,452 | 11/1976 | Cole . |
| 4,040,579 | 8/1977 | McKinney . |
| 4,171,787 | 10/1979 | Zapel . |
| 4,200,253 | 4/1980 | Rowarton ...................... 244/219 |
| 4,252,287 | 2/1981 | Zimmer . |
| 4,351,502 | 9/1982 | Statkus . |
| 4,427,168 | 1/1984 | McKinney et al. ............ 244/219 |

FOREIGN PATENT DOCUMENTS

| | | |
|---|---|---|
| 574500 | 7/1924 | France . |
| 279904 | 11/1930 | Italy . |
| 126441 | 10/1946 | Sweden . |

*Primary Examiner*—Trygve M. Blix
*Assistant Examiner*—Rodney Corl
*Attorney, Agent, or Firm*—Christensen, O'Connor, Johnson & Kindness

[57] ABSTRACT

A variable-camber airfoil includes a four-bar linkage camber altering mechanism and a flexible panel in the lower skin of the airfoil. A flexible upper skin extends from the upper end of a front spar assembly to the upper end of a nose structure of the airfoil. A rotary actuator is mounted forward of the front spar assembly within the cavity of the airfoil, and is used to actuate the camber altering mechanism. A main drive arm, which acts as a link in the camber altering mechanism, extends forwardly from the rotary actuator. To actuate the camber altering mechanism, the main drive arm is rotated downwardly and rearwardly through an arcuate path in a vertical chordwise plane. The main drive arm pulls downwardly on first and second links, which, due to the kinematics of the four-bar linkage, causes the nose structure to rotate and move downwardly and rearwardly in a manner that will produce the desired aerodynamic curvature in the flexible upper skin. As the airfoil is cambered, a forward portion of the lower skin of the airfoil is moved slidingly past the forward edge of a lower skin flexible panel in an upward and rearward direction, causing the forward edge of the panel to flex downwardly.

15 Claims, 19 Drawing Figures

VARIABLE-CAMBER AIRFOIL

BACKGROUND OF THE INVENTION

This invention relates to a variable-camber airfoil, and more particularly to a mechanism for varying the camber of the forward section of the airfoil.

Common structures used to modify the lift characteristics of an airfoil, especially for low-speed operation, are auxiliary leading edge devices, commonly referred to as flaps that pivot, or slats that slide outwardly from the leading edge of the airfoil into a deployed position. When deployed, such devices normally increase the effective wing area and camber of the wing to improve the overall lift characteristics during low speed flight. A drawback with such devices is that they are not able to be deployed to intermediate positions and still maintain the proper flow of air over the airfoil. In particular, during and after deployment, there is an interruption of smooth airflow over the critical airfoil upper surface resulting in an increase in drag and an undesirable lift modification.

To overcome this shortcoming of these leading edge devices used to aid the lift of an airfoil, various prior art devices have appeared that vary the camber of the airfoil by bending the aerodynamic skin surfaces, and thus modify the lift characteristics of the airfoil. Such prior art variable-camber airfoils generally act by changing the shape of flexible upper and/or lower skins to vary the camber of the airfoil surface. One drawback of prior art variable-camber airfoils has been their ability to efficiently satisfy only one or two flight modes, e.g., takeoff and/or landing. If a variable-camber airfoil is to be used on an aircraft, it is desirable to be able to adjust the airfoil contour so that it is usable in a variety of flight modes besides those for takeoff and landing, e.g., during cruise and climb modes, as well as being usable as a trim device to lower aerodynamic drag experienced by the airfoil.

Another drawback of prior art variable-camber airfoils has been the aerodynamic drag induced by multiple discontinuities or breaks present in the lower surface of the airfoils. These breaks occur where airfoil sections abut or overlap one another when the camber of the airfoil is altered, generally from a position other than that employed in the cruise mode. It would, of course, be desirable to decrease or eliminate the aerodynamic drag caused by multiple breaks on the airfoil lower surface during flight conditions in order to increase the flight performance and efficiency of the airfoil.

Furthermore, it is generally desirable for an airfoil camber altering mechanism to be as light in weight as possible while maintaining the requisite stiffness required to efficiently alter the camber of the airfoil, thereby minimizing any weight penalty imposed on an aircraft using a variable-camber airfoil. Additionally, it is desirable for a camber altering mechanism to be relatively simple mechanically in order to decrease maintenance and manufacturing costs while maintaining a high degree of reliability.

SUMMARY OF THE INVENTION

The present invention fulfills the needs not met by prior art devices by providing a continuously adjustable variable-camber airfoil that has a low drag contour free of breaks and gaps in all positions. In its broadest embodiment, the variable-camber airfoil comprises a front spar assembly that extends spanwise through the airfoil. An upper panel that is flexible in the chordwise direction extends from adjacent the front spar assembly to adjacent a nose structure and forms the upper aerodynamic surface of the airfoil between these two portions of the airfoil. The nose structure and upper panel are movable between a first position, wherein the upper panel has a minimum curvature, and a second position, wherein the upper panel has a maximum curvature. The airfoil also includes linkage means for moving the nose structure downwardly and rearwardly from the first position to the second position, thus altering the camber of the airfoil. The linkage includes a support link for supporting the upper panel and for controlling the curvature of the upper panel in conjunction with the nose structure as the nose structure moves from the first position to the second position.

In a preferred embodiment, the variable-camber airfoil includes a rotary actuator that is used to actuate the camber altering linkage. The linkage includes a main drive arm that extends forwardly from the rotary actuator. A first link has one end pivotally connected to the nose structure of the airfoil and its second end pivotally connected to the forwardmost end of the main drive arm. A second link of the camber altering linkage has one end connected to the nose structure and its second end pivotally attached to a point on the main drive arm intermediate the forwardmost end and the rotary actuator. The camber altering linkage also includes a stabilizing link that has one end pivotally connected to the upper portion of the front spar assembly and its other end pivotally connected to approximately the midpoint of the second link. The panel support link has one end pivotally attached to the inner surface of the upper panel and its other end pivotally connected to the midpoint of the stabilizing link.

When the camber altering mechanism is actuated to alter the camber of the airfoil, the main drive arm is moved downwardly and rearwardly through an arcuate path in a vertical chordwise plane by the rotary actuator. As the main drive arm moves downwardly through the arcuate path, it pulls downwardly on the first and second links, which, because of the arrangement of the linkage members, causes the nose structure to move downwardly and rearwardly with the main drive arm while swinging downwardly and rearwardly relative to the forward end of the main drive arm. Since the upper panel is attached to the nose structure, as the nose structure is moved, the curvature of the upper panel between the front spar and the nose structure is increased. The panel support link helps to stabilize and control the desired curvature of the upper panel. Due to the kinematic configuration of the linkage, the nose structure can be deflected into a plurality of desirable aerodynamic positions between the first and second positions when the rotary actuator actuates the camber altering linkage, thus allowing the variable-camber airfoil to be efficiently used in a variety of flight modes.

In another preferred embodiment, the lower aerodynamic surface of the airfoil includes a flexible panel that is pivotally mounted to the lower portion of the front spar assembly. The forward portion of the flexible panel is biased upwardly to insure continuous contact between the forward edge of the flexible panel and the lower surface of the nose structure. When the nose structure swings downwardly and rearwardly, a rigid panel on the lower aerodynamic surface of the nose structure slides past the forward edge of the flexible panel in a rearward and upward direction, forcing the forward edge of the flexible panel downwardly. Since the forward portion of the flexible panel is biased in an upward direction against a positive leading edge cavity pressure, contact between the forward edge of the flexible panel and the rigid panel is maintained, thereby precluding the occurrence of a forwardly facing surface opening. To further insure that the forward edge of the flexible panel remains in contact with the rigid panel, the pivot point of the flexible panel is located forward of the midpoint of the panel. By thus locating the pivot point of the flexible panel, the rear edge of the panel is forced open before the forward edge.

BRIEF DESCRIPTION OF THE DRAWINGS

Other features and advantages of the present invention will become apparent to one skilled in the art after a reading of the following description taken together with the accompanying drawing, in which:

FIG. 7 is a cross-sectional view of the main drive arm taken along section line 7—7 of FIG. 4;

DETAILED DESCRIPTION OF THE INVENTION

Figure 1:
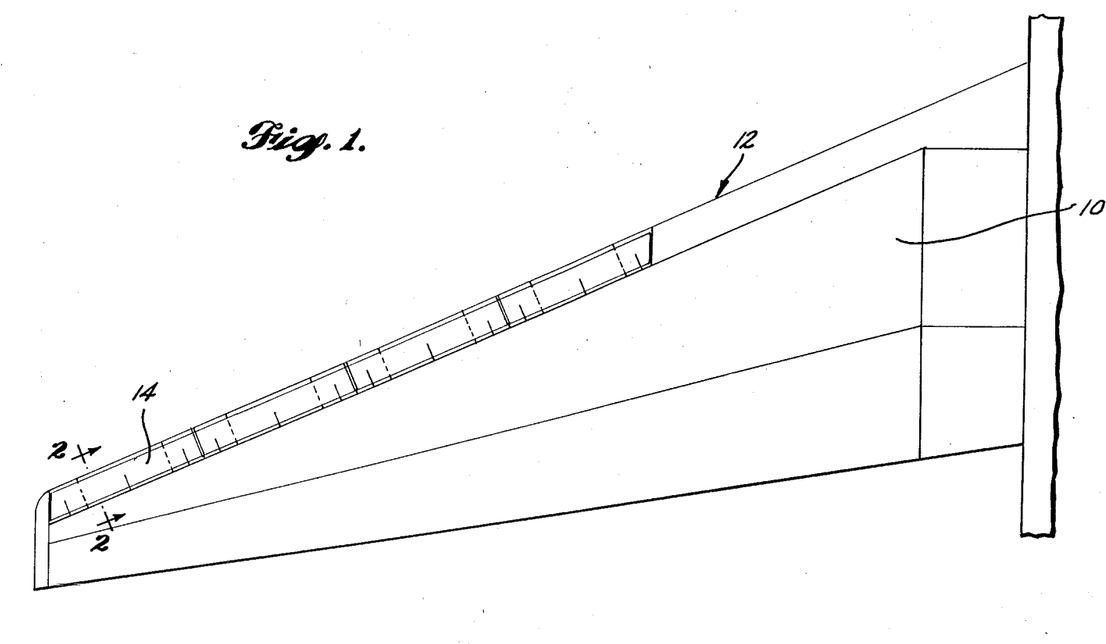
FIG. 1 is a plan view of a variable-camber airfoil incorporating variable-camber sections in the forward area of the wing.

Referring to FIG. 1, a variable-camber airfoil 10 constructed in accordance with the present invention includes a leading edge region 12 having a plurality of forward sections 14 that are adjacent one another. The camber of forward sections 14 can be altered to modify the lift characteristics of airfoil 10. While the thickness of forward sections 14 varies in the spanwise direction, the mechanism and structural components used to alter the camber of each of the forward sections 14 is substantially identical. The apparatus shown in FIG. 2, a cross-sectional view of one forward section 14, is representative of the structure incorporated in each of the forward sections 14 and will be used for descriptive purposes throughout this disclosure.

Figure 2:
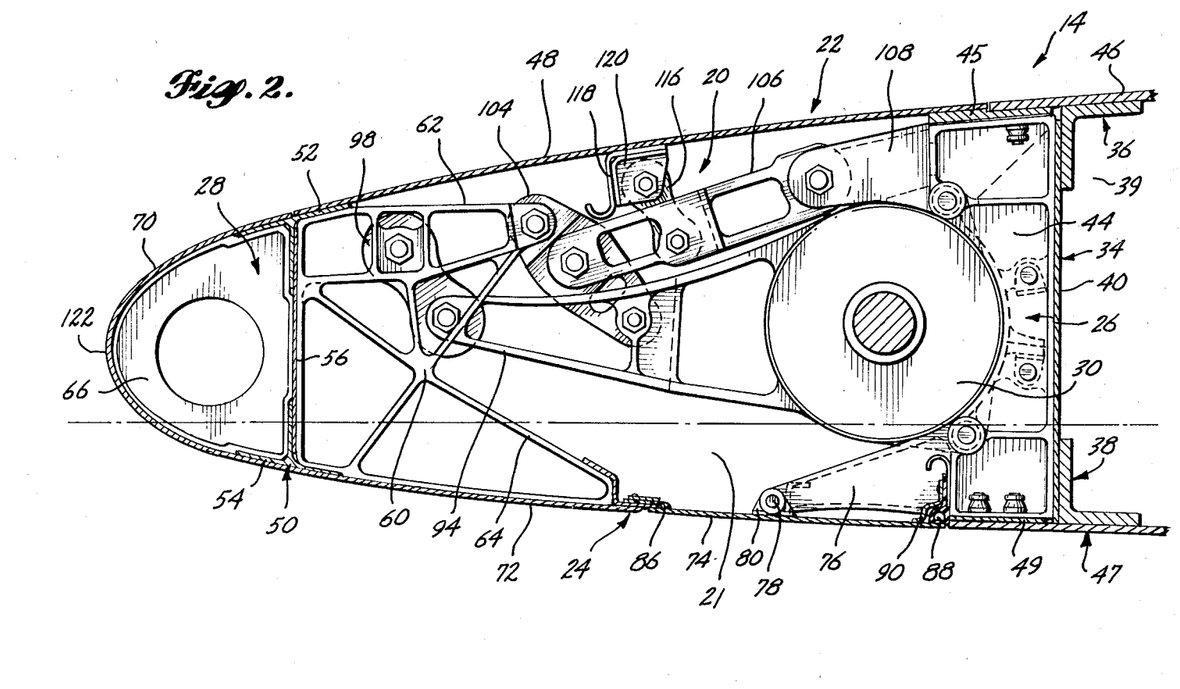
FIG. 2 is a side elevation, cross-sectional view of the variable-camber airfoil taken along section line 2—2 of FIG. 1 with the airfoil in a cruise, or minimum camber position.

Referring now to FIG. 2, an enlarged cross-sectional view of a forward section 14 is illustrated. Forward section 14 includes a camber altering mechanism 20 within the cavity 21 formed between the upper and lower surfaces 22 and 24 of forward section 14. Camber altering mechanism 20 is located forward of a front spar assembly 26 and rearward of a leading edge nose structure 28. Camber altering mechanism 20 generally consists of a 4-bar linkage that is actuated by a rotary actuator 30. By employing rotary actuator 30, camber altering mechanism 20 can smoothly and continuously move forward section 14 between a first position (FIG. 2) wherein airfoil 10 has a minimum camber and a second position (FIG. 4) wherein the airfoil has a maximum camber. By positioning the forward section 14 at selected locations between the minimum and maximum camber positions, the camber of airfoil 10 can be altered into a plurality of configurations allowing airfoil 10 to efficiently satisfy a variety of flight modes.

Forward section 14 will now be described in more detail in conjunction with FIGS. 2, 3, and 4. The front spar assembly 26 is located at the rearmost area of forward section 14. The front spar assembly 26 includes a front spar 34 that extends spanwise the length of airfoil 10. Front spar 34 generally has a "C" shaped configuration with an upper spar chord 36 and a lower spar chord 38 that extend aft into the wing box 39 of airfoil 10. The upper and lower spar chords 36 and 38 are connected by a vertically oriented web 40. A support member 44 that acts as a mounting surface for rotary actuator 30 is mounted to front spar 34 and extends forwardly therefrom. The upper end of support member 44 is fastened to the upper wing skin 46 through a splice plate 45. The lower end of support member 44 is fastened to lower wing skin 47 through a shim 49.

The forward edge of the upper wing skin 46 of airfoil 10 lies in abutment with the rear edge of an upper panel 48. The aft end of upper panel 48 abuts the upper surface of splice plate 45. Upper panel 48 extends forwardly from atop splice plate 45 to a location adjacent nose structure 28. Upper panel 48 is a flexible, continuous member with no breaks or joints in the chordwise direction, thus minimizing the aerodynamic drag generated by air flowing over the upper surface 22 of airfoil 10.

The forward end of upper panel 48 lies in abutment with the upper surface of a nose spar 50 that forms part of nose structure 28. Nose spar 50 extends spanwise the length of airfoil 10 and is generally "I" shaped with an upper flange 52 and a lower flange 54 connected by a web 56. Extending rearwardly from nose spar 50 is a fitting 60. In the preferred embodiment, fitting 60 is a separate component that is fastened to the rear surface of nose spar 50 by means of rivets, bolts, or other conventional fastening means (not shown). The upper portion 62 of fitting 60 extends rearwardly in the chordwise direction and is used as an attachment point for members of the camber altering mechanism 20, as will be described hereinafter. Fitting 60 also has a support rib 64 extending rearwardly from the lower portion of the fitting that provides support for a portion of lower surface 24. Mounted in abutment with the forward surface of nose spar 50 is a forwardly projecting nose rib 66 that forms the underlying structure for a leading edge skin 70. The forward portion of nose rib 66 has a parabolic shape when viewed in the spanwise direction to lend the desired aerodynamic shape to leading edge skin 70.

The leading edge skin 70, which forms part of nose structure 28, abuts the front edge of upper panel 48 on top of upper flange 52. Leading edge skin 70 wraps downwardly and forwardly around the parabolic curve of the forward portion of nose rib 66 and continues rearward past lower flange 54 of nose spar 50 to a point approximately midway between nosespar 50 and front spar 34. A lower section of leading edge skin 70 thus forms a rigid panel 72 of lower surface 24. Rigid panel 72 is securely attached to support rib 64 of fitting 60 by means of rivets, bolts, adhesives, or other conventional fastening means (not shown). In the embodiment shown, a short section of rigid panel 72 extends rearward of the aft end of support rib 64. A flexible panel 74 of lower surface 24 is located rearward of rigid panel 72 and extends rearwardly to a location adjacent the lower end of front spar assembly 26.

In the preferred embodiment, flexible panel 74 is made from a flexible epoxy-fiberglass composite material. Flexible panel 74 is pivotally mounted to the forward end of a lower mounting arm 76 that is integral with and extends forwardly from the lower portion of support member 44. Flexible panel 74 pivots about a pivot pin 78 that extends through a pivot bracket 80 mounted to the inner surface of flexible panel 74 and the forwardmost end of lower mounting arm 76.

Figure 5:
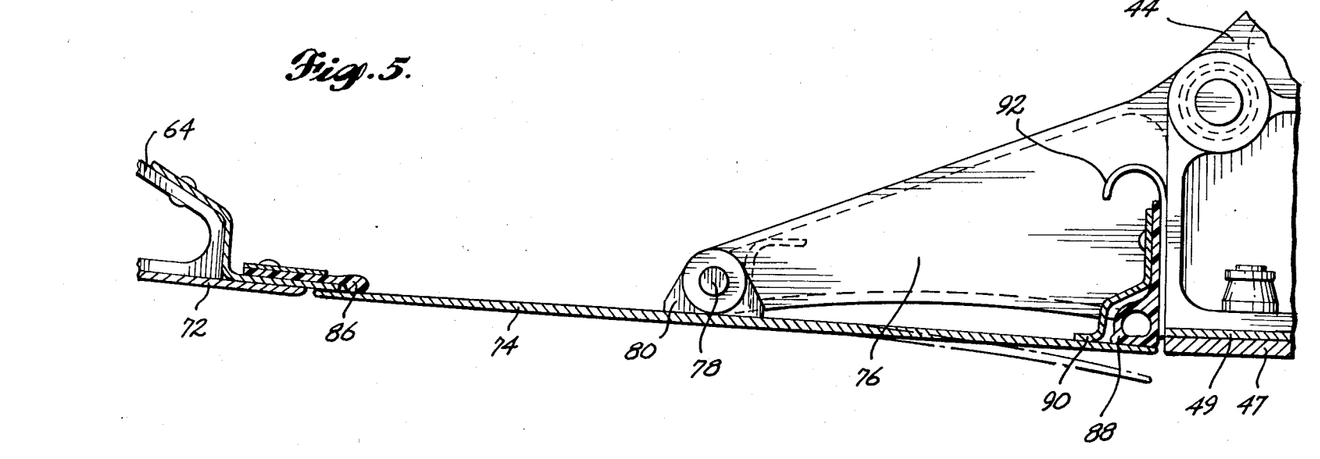
FIG. 5 is an enlarged side elevation, cross-sectional view of the flexible panel installed on the lower surface of the airfoil showing internal venting provisions.

The forward edge of flexible panel 74 is positioned adjacent the rear edge of rigid panel 72 as mentioned previously, with the inner surface of the forward end of flexible panel 74 abutting a front seal 86. Front seal 86 is fastened to the rear end of support rib 64 and the rear edge of rigid panel 72 (FIG. 5). The aft end of front seal 86 turns downwardly to form the contact area at which the inner surface of flexible panel 74 abuts the front seal. The inner surface of the aft end of flexible panel 74 abuts a rear seal 88 and stop bracket 90 that are fastened to a continuous spanwise support channel 92 and support member 44. In the preferred embodiment, rear seal 88 has a "d" shape when viewed in the spanwise direction. Rear seal 88 is made from an elastomeric material so that it will deform when force is exerted against it. The lower end of rear seal 88 extends below the lower end of stop bracket 90 so that when flexible panel 74 is in contact with stop bracket 90, rear seal 88 is compressed and forms an airtight seal against flexible panel 74.

Figure 6:
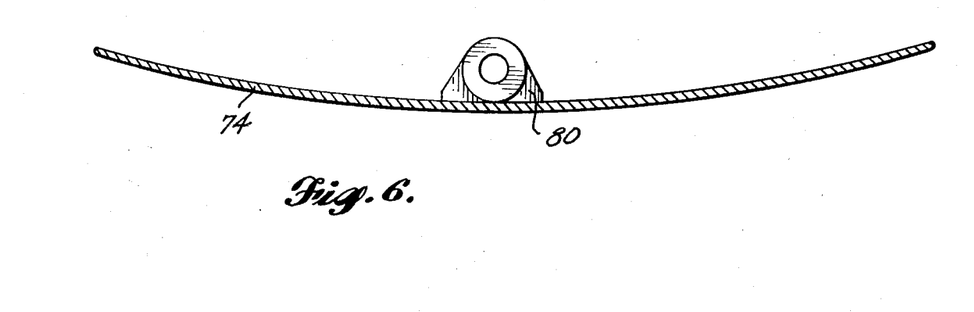
FIG. 6 is a side elevation of the flexible panel showing the contour of the panel before it is mounted on the airfoil.

In the preferred embodiment, and as shown in FIG. 6, flexible panel 74 is formed with an upwardly directed concave configuration when viewed in a spanwise direction. Thus, when flexible panel 74 is mounted on lower mounting arm 76 and forced into a substantially planar configuration, the forward and rear edges of flexible panel 74 are biased upwardly against front seal 86 and stop bracket 90, respectively, insuring that flexible panel 74 remains in contact with the front seal and stop bracket as the camber of airfoil 10 is altered.

Another feature of flexible panel 74 involves the position of pivot bracket 80. In a preferred embodiment, pivot bracket 80 is positioned on flexible panel 74 so that approximately forty percent (40%) of the chordwise dimension of the flexible panel is forward of pivot bracket 80 and the remaining sixty percent (60%) of the panel is rearward of the pivot bracket. This placement of pivot bracket 80 insures that a downward acting force arising from a build up of pressure in cavity 21 will cause the aft end of flexible panel 74 to deflect open (as shown by the dashed line portion of flexible panel 74 in FIG. 5) rather than the forward end, thereby allowing the increased pressure in cavity 21 to be released. If the forward end of flexible panel 74 were deflected open, it would form a ram air scoop and increase the internal cavity pressure with possible damaging consequences.

Figures 7, 9:
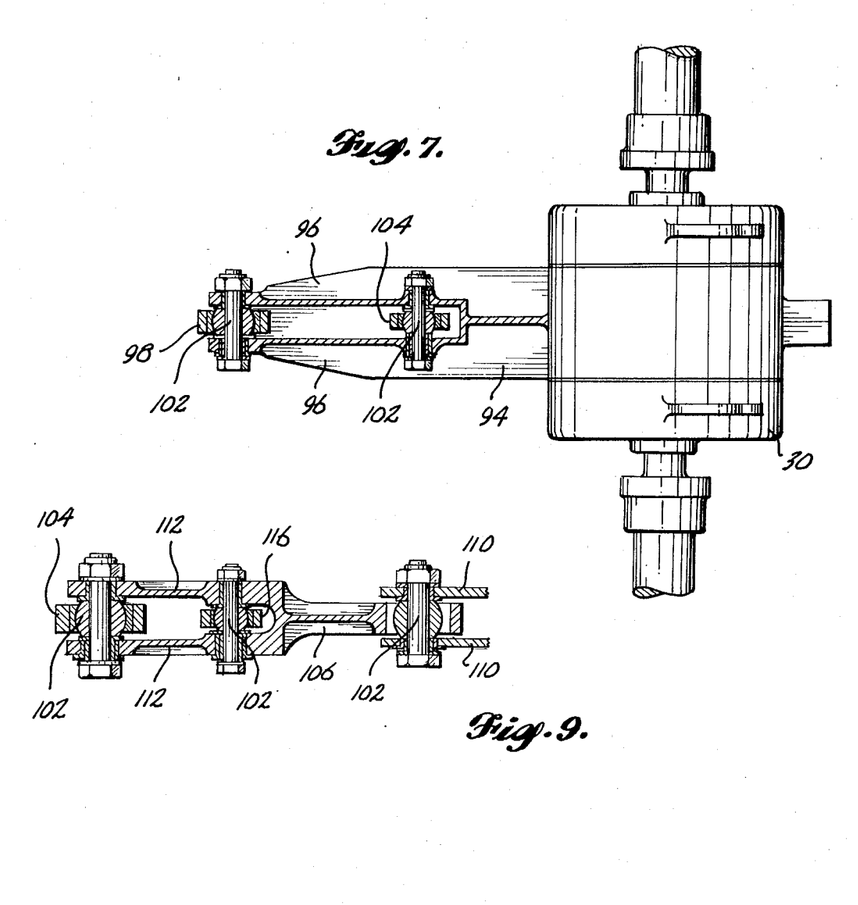
Figure 8:
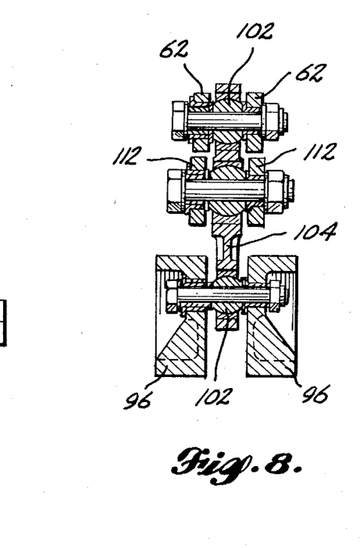
FIG. 8 is a cross-sectional view of one link of the camber altering mechanism taken along section line 8—8 of FIG. 4; and, FIG. 9 is a cross-sectional view of the stabilizing link of the camber altering mechanism taken along section line 9—9 of FIG. 4.

As mentioned previously and as shown in FIGS. 2, 3, and 4, rotary actuator 30 is mounted on the forward side of support member 44 approximately midway between upper and lower surfaces 22 and 24. A main drive arm 94 is one of the links of camber altering mechanism 20 and is integrally mounted to a central portion of rotary actuator 30 that rotates about a spanwise axis. When forward section 14 is in the first or cruise position (FIG. 2), main drive arm 94 extends forward substantially parallel to a line that extends in a chordwise direction between the leading edge and trailing edge of airfoil 10. When rotary actuator 30 is activated, main drive arm 94 moves through a downwardly and rearwardly directed path in a vertical chordwise plane relative to support member 44. As shown in FIG. 7, main drive arm 94 has a forked configuration with the forward portion of main drive arm 94 being comprised of spaced apart and parallel members 96 to receive linkage members therebetween.

Camber altering mechanism 20 also includes a substantially planar first link 98 that is oriented in an upward and forward direction when forward section 14 is in the cruise position (FIG. 2). The lower end of first link 98 is pivotally connected to the forwardmost end of main drive arm 94 between parallel members 96. The upper end of first link 98 is pivotally connected to upper portion 62 of fitting 60 forward of the chordwise midpoint of the upper portion. The upper end of first link 98 is located between parallel surfaces 100 of upper portion 62. The upper and lower ends of first link 98 are pivotally connected to upper portion 62 and main drive arm 94, respectively, by self-aligning spherical bearings 102 (see generally FIG. 7).

The use of self-aligning bearings 102 as pivots is typical for all of the pivoting connections incorporated in the linkage comprising camber altering mechanism 20. This type of pivotal connection allows some misalignment of the linkage components in a vertical plane without resulting in binding contact between the components when the linkage is actuated.

A substantially planar second link 104 has its upper end pivotally connected to the rearmost end of upper portion 62 and its lower end pivotally connected to approximately the midpoint of main drive arm 94. When forward section 14 is in the cruise position, second link 104 is oriented in an upward and forward direction.

Another member of camber altering mechanism 20 is a stabilizing link 106. Stabilizing link 106 is oriented generally in a fore and aft direction when forward section 14 is in the cruise position. The aft end of stabilizing link 106 is pivotally connected to the forwardmost end of an upper mounting arm 108 that is integral with support member 44 and extends forwardly therefrom. Upper mounting arm 108 is comprised of parallel arms 110 that are parallel to one another and spaced apart a distance sufficient to accept the aft end of stabilizing link 106. The forward end of stabilizing link 106 is pivotally mounted to approximately the midpoint of second link 104. As shown in FIG. 9, the forward portion of stabilizing link 106 has a clevis-like configuration with arms 112 that are parallel to one another and spaced apart a distance sufficient to straddle second link 104. Once again, self-aligning spherical bearings 102 are used at each end of stabilizing link 106 to connect the stabilizing link to the other linkage members.

The final member included in camber altering mechanism 20 is a panel support link 116 connecting stabilizing link 106 to a support stringer 118 that is mounted spanwise on the inner surface of upper panel 48. Panel support link 116 helps to control the contour of and provide support for upper panel 48 as the camber of forward section 14 is altered. Support stringer 118 has an inwardly extending gusset 120 that is configured of parallel plates spaced apart in the spanwise direction. The upper end of panel support link 116 fits between the plates of gusset 120 and is connected thereto by a self-aligning spherical bearing (not shown). The lower end of panel support link 116 is located between arms 112 of stabilizing link 106 at approximately the midpoint of the stabilizing link as shown in FIG. 9, and is pivotally connected thereto by another self-aligning spherical bearing 102.

The kinematic solution provided by the linkage system of camber altering mechanism 20 is one that does not induce tension or compression loads into upper panel 48 other than those due to the bending of the upper panel. Therefore, the fatigue life of upper panel 48 will be the fatigue life expected for a panel subjected to pure bending loads.

OPERATION

To alter the camber of airfoil 10, forward section 14 is moved from a first or cruise position (FIG. 2) wherein airfoil 10 has minimum camber to a second or "landing" position (FIG. 4) wherein airfoil 10 has maximum camber by activating rotary actuator 30. When rotary actuator 30 is activated, main drive arm 94 moves downwardly and rearwardly through its arcuate path as shown in FIGS. 3 and 4. As main drive arm 94 moves downwardly, it pulls downwardly on first and second links 98 and 104, and panel link 116, which, due to the kinematic arrangement of the links, causes nose structure 28 and fitting 60 to move downwardly and rearwardly. When nose structure 28 moves downwardly and rearwardly, the curvature of upper panel 48 increases. In the embodiment shown, the leading edge 122 of airfoil 10 is rotated approximately 30° as forward section 14 moves from the cruise to the landing position.

Figure 3:
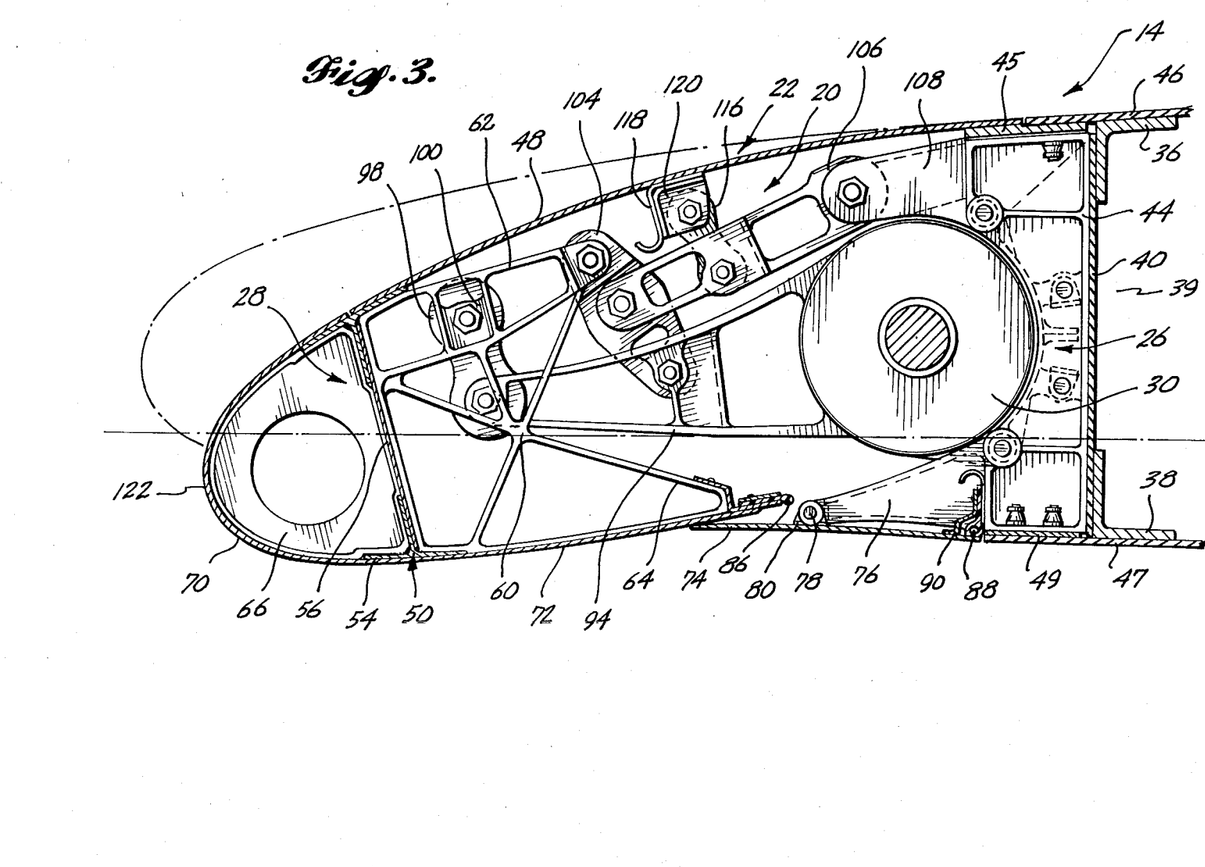
FIG. 3 is a side elevation, cross-sectional view of the variable-camber airfoil of FIG. 2 with the airfoil in a take-off or intermediate camber position.
Figure 4:
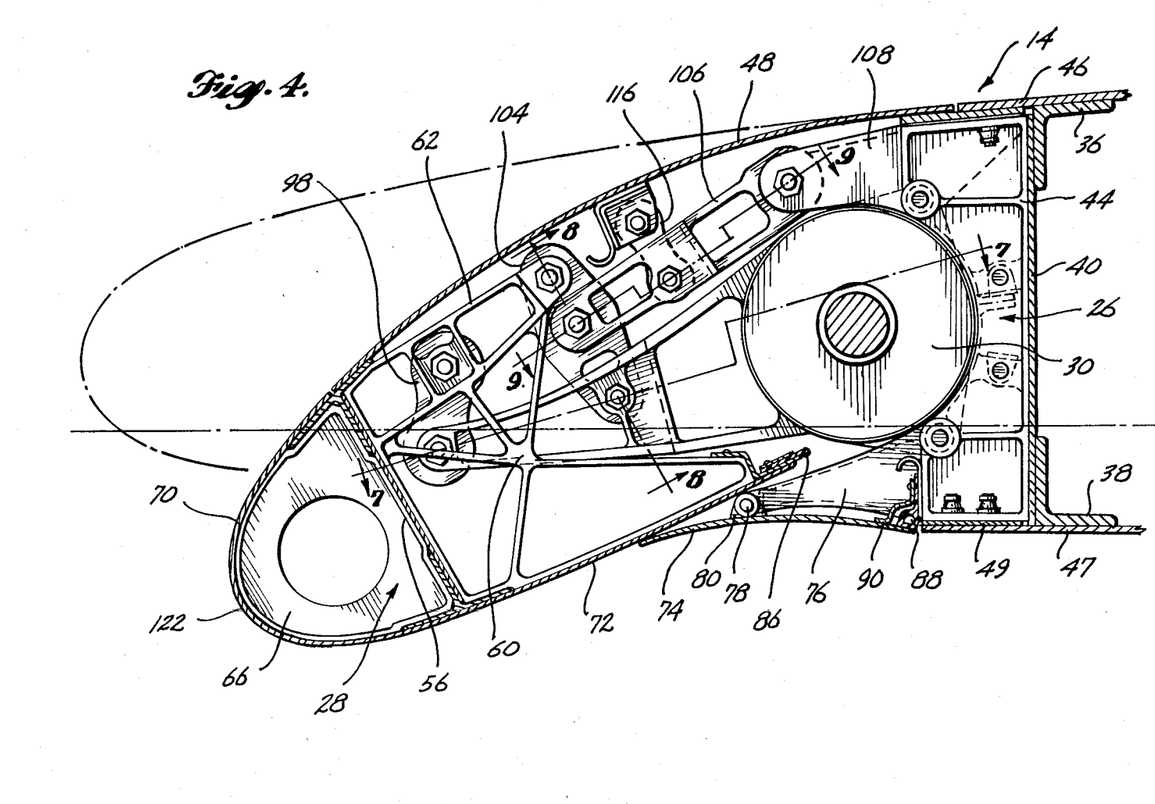
FIG. 4 is a side elevation, cross-sectional view of the variable-camber airfoil of FIG. 2 with the airfoil in a landing or maximum camber position.

As forward section 14 moves toward the landing position, rigid panel 72 moves rearwardly in sliding contact with the forward edge of flexible panel 74 as shown in FIGS. 3 and 4, forcing the forward edge downward. The contact points between the surface of rigid panel 72 and the forward edge of flexible panel 74 are in constant engagement, producing a smooth substantially break free contour of lower surface 24 since the rear edge of flexible panel 74 remains in contact with stop bracket 90 and rear seal 88. Since the forward and rearward edges of flexible panel 74 are biased upwardly as previously described, the forward edge of flexible panel 74 remains in contact with rigid panel 72.

The present invention has been described in relation to a preferred embodiment and variations upon that embodiment. One of ordinary skill after reading the foregoing specification will be able to effect various changes, alterations, and substitutions of equivalents without departing from the broad concepts disclosed. It is therefore intended that the scope of Letters Patent granted hereon be limited only be the definitions contained in the appended claims and equivalents thereof.

The embodiments of the invention in which an exclusive property or privilege is claimed are defined as follows:

1. A variable-chamber airfoil having a span and a chord, comprising:
    a front spar assembly, said front spar assembly extending spanwise through said airfoil and being affixed to said airfoil;
    a nose structure, said nose structure including the leading edge of said airfoil;
    an upper panel, said upper panel extending from adjacent said front spar assembly to adjacent said nose structure, said upper panel being flexible in a chordwise direction and forming a continuous upper aerodynamic surface of said airfoil between said front spar assembly and said nose structure, said nose structure and said upper panel being movable between a first position wherein said upper panel has a minimum curvature and a second position wherein said upper panel has a maximum curvature;
    linkage means for swingably moving said nose structure downwardly and rearwardly from said first position to said second position; and
    a lower aerodynamic surface, said lower aerodynamic surface extending from said front spar assembly to said nose structure, said lower aerodynamic surface including a rigid panel and a flexible panel, said rigid panel being affixed to said nose structure and movable therewith, a pivot mounted on the inner surface of said flexible panel, said flexible panel being pivotally mounted to said front spar assembly, said flexible panel having forward and rear ends that are biased upwardly, said pivot that is mounted on said inner surface of said flexible panel being mounted forward of the midpoint between said forward and rear ends of said flexible panel, said rigid panel movement being controlled by the linkage mechanism to remain in sliding contact with said forward end of said flexible panel when said nose structure moves between said first and second positions.

2. The variable-chamber airfoil of claim 1, further comprising actuator means for actuating said linkage means.

3. The variable-chamber airfoil of claim 1 wherein said linkage means includes:
    a main drive arm, said main drive arm being attached to said actuator means and having a forwardmost end;
    a first link, said first link having a first end and a second end, said first end of said first link being pivotally connected to said nose structure, said second end of said first link being pivotally connected to said forwardmost end of said main drive arm;
    a second link, said second link having a first end and a second end, said first end of said second link being pivotally connected to said nose structure, said second end of said second link being pivotally connected to said main drive arm at a point intermediate said forwardmost end and said actuator means;
    a stabilizing link, said stabilizing link having a first end and a second end, said first end of said stabilizing link being pivotally connected to said second link intermediate said first and said second ends of said second link, said second end of said stabilizing link being pivotally connected to said front spar assembly; and,
    a panel support link, said panel support link having a first end and a second end, said first end of said panel support link being pivotally connected to the inner surface of said upper skin panel, said second end of said panel support link being pivotally connected to said stabilizing link.

4. A variable-chamber airfoil having a span and a chord comprising:
   a front spar assembly, said front spar assembly extending spanwise relative to said airfoil;
   a leading edge nose structure, said nose structure extending spanwise relative to said airfoil;
   an upper panel, said upper panel extending from adjacent said front spar assembly to abut said nose structure, said upper panel being flexible in a chordwise direction and forming a continuous upper aerodynamic surface of said airfoil between said front spar assembly and said nose structure, said nose structure and said upper panel being movable between a first position wherein said upper panel has a minimum curvature and a second position wherein said upper panel has a maximum curvature;
   linkage means operably associated with said airfoil for swingably moving said nose structure downwardly and rearwardly from said first position to said second position, said linkage means including support link means for supporting said upper panel and for controlling the curvature of said upper panel as said panel moves from said first position to said second position;
   a lower aerodynamic surface extending from said front spar assembly to said nose structure, said lower aerodynamic surface including a rigid panel and a flexible panel, said flexible panel having forward and rear ends that are biased upwardly, said flexible panel being positioned to abut said rigid panel when the upper panel is in said first position, said rigid panel being movable in slidable contact with said flexible panel as said upper panel moves from said first position to said second position; and
   a pivot affixed to said flexible panel at a point located forward of the midpoint between said forward and rear ends of said flexible panel, said flexible panel being pivotally mounted to said front spar assembly.

5. The variable-camber airfoil of claim 4, further comprising actuator means for actuating said linkage means.

6. The variable-camber airfoil of claim 5, wherein said linkage means includes:
   a main drive arm, said main drive arm being attached to said actuator means and having a forwardmost end;
   a first link, said first link having a first end and a second end, said first end of said first link being pivotally connected to said nose structure, said second end of said first link being pivotally connected to said forwardmost end of said main drive arm;
   a second link, said second link having a first end and a second end, said first end of said second link being pivotally connected to said nose structure, said second end of said second link being pivotally connected to said main drive arm at a point intermediate said forwardmost end and said actuator means;
   a stabilizing link, said stabilizing link having a first end and a second end, said first end of said stabilizing link being pivotally connected to said second link intermediate said first and said second ends of said second link, said second end of said stabilizing link being pivotally connected to said front spar assembly; and,
   said support link means including a panel support link having a first end and a second end, said first end of said panel support link being pivotally connected to the inner surface of said upper skin panel, said second end of said panel support link being pivotally connected to said stabilizing link.

7. The variable-camber airfoil of claim 6, further comprising:
   first seal means mounted to said nose structure for providing a seal between said nose structure and said forward edge of said flexible panel when said nose structure is in said first position.

8. The variable-camber airfoil of claim 7, further comprising:
   second seal means mounted to said front spar assembly for providing a seal between said front spar assembly and said rear edge of said flexible panel.

9. A variable-camber airfoil comprising:
   a front spar assembly, said front spar assembly extending spanwise through said airfoil, said front spar assembly including a front spar and a support member affixed to said front spar and extending forwardly therefrom, said support member including an upper mounting arm adjacent said upper end of said support member and extending forwardly therefrom and having a forwardmost end, said support member including a lower mounting arm adjacent said lower end of said support member and extending forwardly therefrom and having a forwardmost end;
   a nose structure, said nose structure being movable between a first position wherein said airfoil has minimum camber and a second position wherein said airfoil has maximum camber, said nose structure including a nose spar extending spanwise through said airfoil, said nose spar haing an upper end and a lower end, said nose structure having a fitting projecting rearwardly in the chordwise direction from said nose spar, said fitting having an upper portion with a rearmost end and a support rib, said nose structure including a nose rib extending forwardly in the chordwise direction from said nose spar;
   an upper panel, said upper panel being flexible and having a forward edge, a rear edge, and an inner surface, said upper panel extending from said front spar assembly to said nose structure, said rear edge of said upper panel abutting said upper end of said support member, said forward edge abutting said upper end of said nose spar;
   a rotary actuator, said rotary actuator being mounted to said support member;
   camber altering means for moving said nose structure through an arcuate path in a vertical chordwise plane and for altering the curvature of said upper panel, said camber altering means including:
   a main drive arm, said main drive arm extending forwardly from said rotary actuator and having a forwardmost end, said main drive arm being rotatable through an arcuate path in a vertical chordwise plane,
   a first link, said first link having an upper end and a lower end, said upper end of said first link being pivotally connected to said upper portion of said attachment fitting at a point intermediate said rearmost end and said nose spar, said lower end of said first link being pivotally connected to said forwardmost end of said main drive arm, a second link, said second link having an upper and a lower end, said upper end of said second link being pivotally connected to said rearmost end of said upper portion of said fitting, said lower end of said second link being pivotally connected to said main drive arm at a point intermediate said forwardmost end and said rotary actuator, a stabilizing link, said stabilizing link having a forwardmost end and a rearmost end, said forwardmost end being pivotally connected to said second link at a point intermediate said upper and said lower ends of said second link, said rearmost end of said stabilizing link being pivotally connected to said forwardmost end of said upper mounting arm of said front spar assembly, a panel support link, said panel support link having an upper end and a lower end, said upper end being pivotally attached to said inner surface of said upper panel, said lower end being pivotally connected to said stabilizing link at a point intermediate said forwardmost and said rearmost ends; and, a lower aerodynamic surface spaced away from said upper skin.

10. The variable-camber airfoil of claim 9 wherein said lower aerodynamic surface includes:

a rigid panel having a rear edge and a flexible panel having a forward edge and a rear edge, said rear edge of said rigid panel and said forward edge of said flexible panel being adjacent one another when said nose structure is in said first position, said rigid panel being fastened to said support rib of said fitting, a pivot mounted on the inner surface of said flexible panel, said flexible panel being pivotally mounted to said forwardmost end of said lower mounting arm of said support member, said rigid panel being movable past the forward edge of said flexible panel when said camber altering means moves said nose structure through said arcuate path.

11. The variable-camber airfoil of claim 10, wherein said forward and rear edges of said flexible panel are biased upwardly thereby applying an inwardly directed force at said forward and said rear edges of said flexible panel.

12. The variable-camber airfoil of claim 11, further comprising:

first seal means mounted to said nose structure for providing a seal between said rear edge of said rigid panel and said forward edge of said flexible panel when said nose structure is in said first position.

13. The variable-camber airfoil of claim 12, further comprising:

second seal means for providing a seal between said rear edge of said flexible panel and said lower mounting arm of said front spar assembly.

14. The variable-camber airfoil of claim 9, wherein said main drive arm has a forked configuration including a first member and a second member that are parallel to one another and spaced apart a distance sufficient to receive said first link.

15. The variable-camber airfoil of claim 10, wherein the pivot on said inner surface of said flexible panel connecting said flexible panel to said forwardmost end of said lower mounting arm is positioned forward of the midpoint between said forward and rear edges of said flexible panel.

* * * * *